(12) United States Patent
Park

(10) Patent No.: US 7,758,685 B2
(45) Date of Patent: Jul. 20, 2010

(54) INK COMPOSITION, AND INK CARTRIDGE INCLUDING THE INK COMPOSITION

(75) Inventor: Heung-sup Park, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 589 days.

(21) Appl. No.: 11/707,129

(22) Filed: Feb. 16, 2007

(65) Prior Publication Data

US 2007/0295241 A1   Dec. 27, 2007

(30) Foreign Application Priority Data

Jun. 22, 2006  (KR) .................. 10-2006-0056259

(51) Int. Cl.
*C09D 11/00* (2006.01)
(52) U.S. Cl. .............. 106/31.59; 106/31.89; 106/31.58; 106/31.86; 106/31.46; 106/31.75
(58) Field of Classification Search .............. 106/31.59, 106/31.89, 31.58, 31.86, 31.46, 31.75
See application file for complete search history.

(56) References Cited

U.S. PATENT DOCUMENTS

| | | | |
|---|---|---|---|
| 4,957,553 A | | 9/1990 | Koike et al. |
| 5,536,306 A | * | 7/1996 | Johnson et al. .......... 106/31.49 |
| 5,626,655 A | * | 5/1997 | Pawlowski et al. ....... 106/31.27 |
| 5,643,357 A | * | 7/1997 | Breton et al. ............ 106/31.25 |
| 6,379,443 B1 | * | 4/2002 | Komatsu et al. ......... 106/31.58 |
| 6,524,383 B2 | * | 2/2003 | Komatsu et al. ............ 106/493 |
| 6,749,675 B2 | | 6/2004 | Momose |
| 7,147,700 B2 | * | 12/2006 | Hoshi et al. .............. 106/31.89 |
| 2001/0032566 A1 | * | 10/2001 | Yatake .................... 106/31.58 |
| 2003/0101905 A1 | * | 6/2003 | Momose .................. 106/31.58 |
| 2004/0226477 A1 | * | 11/2004 | Hoshi et al. .............. 106/31.86 |

* cited by examiner

*Primary Examiner*—Jerry Lorengo
*Assistant Examiner*—Veronica Faison Gee
(74) *Attorney, Agent, or Firm*—Roylance, Abrams, Berdo & Goodman, L.L.P.

(57) ABSTRACT

An ink composition is provided which has excellent storage stability, good defoaming properties, and improved resistance to bleeding on the print paper during image forming, while preventing nozzle clogging when used in a wet-type image forming apparatus. The ink composition according to an exemplary embodiment of the present invention includes a colorant, a solvent, and a plurality of additives. The plurality of additives are of the same type and have one or more hydrophilic groups and one or more hydrophobic groups. Each of the one or more hydrophobic groups of the plurality of additives have the same structure, each of the one or more hydrophilic groups of the plurality of additives have the same structure, or each of the one or more hydrophobic groups and each of the one or more hydrophilic groups of the plurality of additives have the same structure.

37 Claims, No Drawings

INK COMPOSITION, AND INK CARTRIDGE INCLUDING THE INK COMPOSITION

CROSS-REFERENCE TO RELATED APPLICATIONS

This application claims the benefit under 35 U.S.C. §119 (a) of Korean Patent Application No. 10-2006-0056259, filed on Jun. 22, 2006, in the Korean Intellectual Property Office, the entire disclosure of which is hereby incorporated by reference in its entirety.

BACKGROUND OF THE INVENTION

1. Field of the Invention

The present invention relates to an ink composition. More specifically, the present invention relates to an ink composition, which has excellent storage stability and good defoaming properties, as well as improved resistance to bleeding on the print paper during image forming, while preventing nozzle clogging when used in a wet-type image forming apparatus. The invention is further directed to an ink cartridge containing the ink composition.

2. Description of the Related Art

Generally, colorants are substances which exhibit inherent colors by selectively absorbing or reflecting visible light. Colorants are generally divided into classes of dyes and pigments.

Dyes, which are dissolved in solvents, are colorants absorbed into materials to be dyed, such as fibers, leather, fur, and paper, by various methods. The dyes are selected to have considerable fastness even in conditions of constant daylight washing, friction, and the like. Pigments, which are insoluble in solvents, are particulates having coloring matters, and are not directly absorbed into the material to be dyed, but are adhered to the surface of the material to be dyed by physical methods (using, for example, adhesives or the like), to provide their inherent colors.

Ink compositions are used to color a specific object with a desired color by dissolving or dispersing a colorant in a solvent. Ink compositions are particularly suitable for forming images on paper. There are various types of ink composition according to the materials or methods used in preparation of the ink composition, such as ink compositions prepared by dissolving dyes in an aqueous or nonaqueous medium, ink compositions prepared by dispersing pigments in an aqueous or nonaqueous medium, or solid ink compositions which can be melted by applying heat.

Among these, ink compositions prepared by dissolving dyes in an aqueous medium are the most commonly used at present. Such ink compositions have excellent color tone and high stability when applied to the human body and the environment. Such ink compositions are used, for example, in a wet-type image forming apparatus, which are convenient for printing in the home or office and have become widely utilized in recent years. Accordingly, it is possible to form images of a high quality similar to the quality of a silver gelatin photograph.

The ink composition may be used in a wet-type image forming apparatus. To perform high-quality image recording over a long period using an aqueous ink composition for forming images, the ink composition should have suitable viscosity, surface tension, density, or other properties. If an inlet to the nozzle, which is the discharge port for the ink composition of a wet-type image forming apparatus, becomes clogged by used ink composition, if a precipitate is produced by heat or the like, or if the properties of the ink change during the storage of the ink composition, the quality of the image formed using the ink composition naturally deteriorates.

When the ink composition is stored for a long time in an ink storage part capable of storing a large amount of the ink composition, bubbles may be formed or dissolved in the ink composition. If the ink composition is used in this state, problems arise. The fluidity of the storage part or the flow passage of the ink composition may be inhibited, or bubbles may be absorbed into the nozzle, which has a narrow diameter, when the ink composition is ejected, so it may be difficult to eject the ink composition.

Furthermore, when printing at a high speed, that is, under high frequency operating conditions, the discharge performance of the ink composition is greatly affected by fine bubbles generated in the vicinity of the heater of the heat head, at the tip of the nozzles, or adhered to the sides of the nozzles. This effect has been increasingly discussed, because characteristics necessary for high-speed printing are important factors being demanded for the ink composition.

Therefore, it is necessary to remove the bubbles contained in the ink composition, or prevent the generation of bubbles.

U.S. Pat. No. 4,957,553 discloses an ink composition using a single defoaming agent in order to improve the defoaming properties of the ink composition while maintaining the surface tension of the colorant. In the same patent, secondary alkyl alcohols having 7 or less carbon atoms or ethylene oxide adducts thereof, acetylene alcohol or acetylene glycol, as a defoaming agent, are added to the ink composition. In this case, however, there are problems in that the nozzle is clogged, dynamic surface tension changes due to low solubility when the ink flows through the flow passage of the ink composition in a head of a wet-type image forming apparatus, and the antifoaming property may decrease depending on the concentration of the defoaming agent.

Additionally, U.S. Pat. No. 6,749,675 discloses an ink composition for a wet-type image forming apparatus in which one or more types of acetylene alcohol and one or more types of surfactant are used in order to improve recording stability.

A mixture of acetylene alcohol and surfactant separates into different phases when the fluid moves, so that long-term storage stability is reduced due to low fluidity and solubility of the acetylene alcohol.

A method is required to guarantee the performance of the additive, which prevents the generation of bubbles in the ink composition and removes the generated bubbles, without causing problems such as clogging the nozzle, reducing the antifoaming properties due to the concentration of the defoaming agent and phase-separation when the fluid moves.

SUMMARY OF THE INVENTION

Exemplary embodiments of the present invention address at least the above problems and/or disadvantages and provide at least the advantages described below. Accordingly, an exemplary aspect of the present invention is to provide an ink composition which has excellent storage stability, good defoaming properties, and improved resistance to bleeding on the print paper during image forming, while preventing nozzle clogging when used in a wet-type image forming apparatus.

The foregoing and other objects and advantages are substantially realized by providing an ink composition comprising a colorant, a solvent, and a plurality of additives, wherein the plurality of additives are of the same type and have one or more hydrophilic groups and one or more hydrophobic groups. Each of the hydrophobic groups of the additives can be the same and each of the hydrophilic groups of the can be the same.

The additive is a component selected from the group consisting of a defoaming agent, an emulsifier and a nozzle clogging inhibitor.

The plurality of additives contained in the ink composition according to an exemplary embodiment of the present invention include the hydrophobic group with the same structure, the structure being either the following Formula (I), $$X-R^1 \quad (I)$$

or the following Formula (II), $$R^1-X-R^2 \quad (II),$$

in which $R^1$ and $R^2$ are each independently selected from the group consisting of a hydrogen atom, a substituted or unsubstituted $C_5$ to $C_{25}$ alkyl group, a substituted or unsubstituted $C_5$ to $C_{25}$ cyclic alkyl group, a substituted or unsubstituted $C_5$ to $C_{25}$ heteroalkyl group, a substituted or unsubstituted $C_5$ to $C_{25}$ alkenyl group, a substituted or unsubstituted $C_5$ to $C_{25}$ alkoxy group, a substituted or unsubstituted $C_5$ to $C_{25}$ alkylsulfonamide group, a substituted or unsubstituted $C_5$ to $C_{25}$ arylsulfonamide group, a substituted or unsubstituted $C_5$ to $C_{25}$ acylamino group, $C_5$ to $C_{25}$ alkylureido group, $C_6$ to $C_{26}$ arylureido group, $C_5$ to $C_{25}$ alkoxycarbonyl group, $C_5$ to $C_{25}$ alkoxycarbonylamino group, a carbamoyl group, a sulfamoyl group, a sulfo group or salts thereof, a carboxy group or salts thereof, a substituted or unsubstituted $C_1$ to $C_{20}$ hydroxyalkyloxyalkyl group, a substituted or unsubstituted $C_5$ to $C_{25}$ dialkylaminoalkyl group, a substituted or unsubstituted $C_5$ to $C_{25}$ pyridyl group, a substituted or unsubstituted $C_6$ to $C_{26}$ pyridylalkyl group, a substituted or unsubstituted $C_6$ to $C_{26}$ imidazolyl group, a hydrazine group, a hydrozone group, a substituted or unsubstituted $C_5$ to $C_{25}$ pyridylalkyl group, a substituted or unsubstituted $C_6$ to $C_{26}$ aryl group, a substituted or unsubstituted $C_6$ to $C_{26}$ arylalkyl group, a substituted or unsubstituted $C_6$ to $C_{26}$ heteroaryl group, $C_6$ to $C_{26}$ heteroarylalkyl group, a substituted or unsubstituted $C_6$ to $C_{26}$ heteroarylalkenyl group, and a substituted or unsubstituted $C_5$ to $C_{25}$ heterocycloalkyl group; and X is selected from the group consisting of alkylcarboxylic acid salts, alcohol sulfonic acid ester salts, alkylsulfonic acid salts, alkylbenzenesulfonic acid salts, aliphatic amine salts, quaternary ammonium salts, sulfonium salts, phosphonium salts, hydroxides, polyoxyethylene alkyl ethers, polyoxyethylene alkylphenyl ethers, polyoxyethylene secondary alcohol ethers, polyoxyethylene-oxypropylene block copolymers, polyglycerine fatty acid esters, sorbitan fatty acid esters, acetylenic polyalkylene oxides, and acetylenic diols.

The plurality of additives contained in the ink composition according to an exemplary embodiment of the present invention include the hydrophilic group with the same structure, the structure being either the following Formula (III), $$R-X^1 \quad (III)$$

or the following Formula (IV), $$X^1-R-X^2 \quad (IV),$$

in which R is selected from the group consisting of a hydrogen atom, a substituted or unsubstituted $C_5$ to $C_{25}$ alkyl group, a substituted or unsubstituted $C_5$ to $C_{25}$ cyclic alkyl group, a substituted or unsubstituted $C_5$ to $C_{25}$ heteroalkyl group, a substituted or unsubstituted $C_5$ to $C_{25}$ alkenyl group, a substituted or unsubstituted $C_5$ to $C_{25}$ alkoxy group, a substituted or unsubstituted $C_5$ to $C_{25}$ alkylsulfonamide group, a substituted or unsubstituted $C_5$ to $C_{25}$ arylsulfonamide group, a substituted or unsubstituted $C_5$ to $C_{25}$ acylamino group, $C_5$ to $C_{25}$ alkylureido group, $C_6$ to $C_{26}$ arylureido group, $C_5$ to $C_{25}$ alkoxycarbonyl group, $C_5$ to $C_{25}$ alkoxycarbonylamino group, a carbamoyl group, a sulfamoyl group, a sulfo group or salts thereof, a carboxy group or salts thereof, a substituted or unsubstituted $C_1$ to $C_{20}$ hydroxyalkyloxyalkyl group, a substituted or unsubstituted $C_5$ to $C_{25}$ dialkylaminoalkyl group, a substituted or unsubstituted $C_5$ to $C_{25}$ pyridyl group, a substituted or unsubstituted $C_6$ to $C_{26}$ pyridylalkyl group, a substituted or unsubstituted $C_6$ to $C_{26}$ imidazolyl group, a hydrazine group, a hydrozone group, a substituted or unsubstituted $C_5$ to $C_{25}$ pyridylalkyl group, a substituted or unsubstituted $C_6$ to $C_{26}$ aryl group, a substituted or unsubstituted $C_6$ to $C_{26}$ arylalkyl group, a substituted or unsubstituted $C_6$ to $C_{26}$ heteroaryl group, $C_6$ to $C_{26}$ heteroarylalkyl group, a substituted or unsubstituted $C_6$ to $C_{26}$ heteroarylalkenyl group, and a substituted or unsubstituted $C_5$ to $C_{25}$ heterocycloalkyl group; and $X^1$ and $X^2$ are each independently selected from the group consisting of alkylcarboxylic acid salts, alcohol sulfonic acid ester salts, alkylsulfonic acid salts, alkylbenzenesulfonic acid salts, aliphatic amine salts, quaternary ammonium salts, sulfonium salts, phosphonium salts, hydroxides, polyoxyethylene alkyl ethers, polyoxyethylene alkylphenyl ethers, polyoxyethylene secondary alcohol ethers, polyoxyethylene-oxypropylene block copolymers, polyglycerine fatty acid esters, sorbitan fatty acid esters, acetylenic polyalkylene oxides, and acetylenic diols.

The unsubstituted $C_5$ to $C_{25}$ alkyl group is selected from the group consisting of pentyl, iso-amyl, hexyl, octyl, nonyl and decyl, the heteroalkyl group is selected from the group consisting of methoxy, ethoxy, propoxy, butoxy, t-butoxy, fluoromethoxy, chloromethoxy, trifluoromethoxy, trifluoroethoxy, fluoroethoxy and fluoropropoxy; the unsubstituted $C_5$ to $C_{25}$ alkenyl group is selected from the group consisting of ethylene, propylene, butylene, and hexylene; the aryl group is selected from the group consisting of phenyl, naphthyl, and tetrahydronaphthyl, and substituted with a substituent selected from the group consisting of haloalkylene, nitro, cyano, alkoxy and lower alkylamino; and the arylalkyl group is either benzyl or phenylethyl. The hydrogen atoms contained in the alkyl group, the heteroalkyl group, the alkenyl group, the aryl group, the arylalkyl group, the heteroaryl group and the heteroarylalkyl group may be substituted with a halogen atom, a hydroxy group, a nitro group, a cyano group, an amino group, an amidino group, a hydrazine group, a hydrazone group, a carboxyl group or salts thereof, a sulfonic acid group or salts thereof, a phosphoric acid group or salts thereof, a $C_5$ to $C_{25}$ alkyl group, a $C_5$ to $C_{25}$ alkenyl group, a $C_5$ to $C_{25}$ alkynyl group, a $C_5$ to $C_{25}$ heteroalkyl group, a $C_5$ to $C_{25}$ aryl group, a $C_6$ to $C_{26}$ arylalkyl group, a $C_6$ to $C_{26}$ heteroaryl group, or a $C_6$ to $C_{26}$ heteroarylalkyl group, respectively.

The compound of Formula (I) can have the following Formula (V),

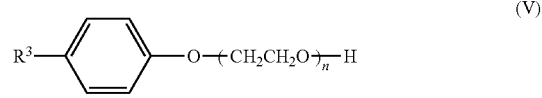

in which $R^3$ is a $C_1$ to $C_6$ alkyl group; and n is an integer from 1 to 50.

In another embodiment, the compound of Formula (I) can have the following Formula (VI),

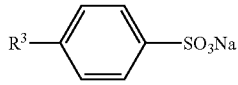

in which $R^4$ is one of a hydrogen atom, a halogen atom and a $C_1$ to $C_{20}$ alkyl group.

The compound of Formula (II) can have the following Formula (VII),

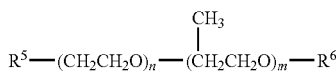

in which $R^5$ and $R^6$ are each independently one of a hydrogen atom, a halogen atom and a $C_1$ to $C_{20}$ alkyl group; n and m are integers from 0 to 50; and n+m is 1 or more.

The compound of Formula (I) can have the following Formula (VIII),

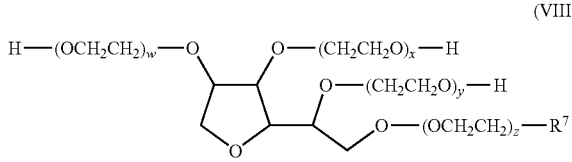

in which $R^7$ is a $C_1$ to $C_{20}$ alkyl group; and w+x+y+z is an integer from 1 to 100.

The compound of Formula (III) can have the following Formula (V),

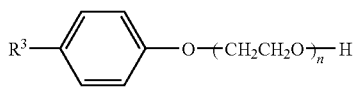

in which $R^3$ is a $C_1$ to $C_6$ alkyl group; and n is an integer from 1 to 50.

The compound of Formula (IV) can have the following Formula (VII),

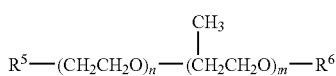

in which $R^5$ and $R^6$ are each independently one of a hydrogen atom, a halogen atom and a $C_1$ to $C_{20}$ alkyl group; n and m are integers from 0 to 50; and n+m is 1 or more.

In another embodiment the Formula (III) can have the following Formula (VIII),

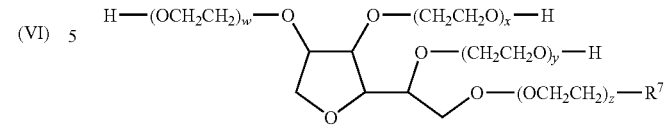

in which $R^7$ is a $C_1$ to $C_{20}$ alkyl group; and w+x+y+z is an integer from 1 to 100.

The compound of Formula (IV) can also be an acetylene and have the following Formula (IX),

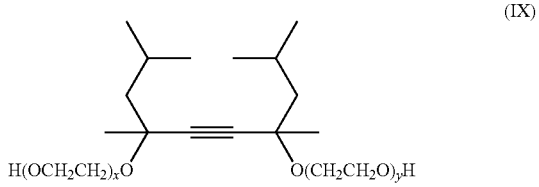

in which x and y are integers from 0 to 100.

In one embodiment of the invention X, $X^1$ and $X^2$ are non-ionic polymers having 1 to 30 repeating units.

The compounds of Formulae (I) and (III) comprise polyethyleneglycol- or polyoxyethylene-based compounds. The compounds of Formulae (II) and (IV) can be acetylene glycol- or acetylene alcohol-based compounds.

The plurality of additives are contained in an amount from 0.1 to 20 parts by weight, and more preferably, 0.1 to 10 parts by weight based on 100 parts by weight of the ink composition. The total content of the plurality of additives is 40 parts by weight or less based on 100 parts by weight of the ink composition.

The colorant contained in the ink composition according to an exemplary embodiment of the present invention is one of dyes, pigments and self-dispersing pigments, and contained in an amount from 0.5 to 10 parts by weight based on 100 parts by weight of the ink composition.

The solvent contained in the ink composition according to an exemplary embodiment of the present invention is either water or a mixture of water with one or more organic solvents, wherein the organic solvent is contained in an amount from 2 to 60 parts by weight based on 100 parts by weight of the ink composition. The organic solvent is preferably selected from the group consisting of alcohols, such as methyl alcohol, ethyl alcohol, n-propyl alcohol, isopropyl alcohol, n-butyl alcohol, sec-butyl alcohol, t-butyl alcohol, and isobutyl alcohol; polyhydric alcohols, such as ethylene glycol, diethylene glycol, trimethylolpropane glycerol, polyethylene glycol, and polypropylene glycol; ketones, such as acetone, methyl ethyl ketone, and diacetone alcohol; esters, such as ethyl acetate and ethyl lactate; lower alkyl ethers, such as ethylene glycol monomethyl ether, ethylene glycol monoethyl ether, diethylene glycol methyl ether, diethylene glycol ethyl ether, triethylene glycol monomethyl ether, and triethylene glycol monoethyl ether; nitrogen-containing compounds, such as 2-pyrolidone, N-methyl-2-pyrolidone, and caprolactam; dimethyl sulfoxide; tetramethylsulfone; and thioglycol.

The ink composition according to an exemplary embodiment of the present invention has a surface tension of 15 to 70 dyne/cm at 20° C., and a viscosity of 1.5 to 10 cps.

The ink composition according to an exemplary embodiment of the present invention further includes one or more of a surfactant, a viscosity modifier, an acid, a base, a dispersing agent, and a metal oxide.

The surfactant is contained in an amount from 0.1 to 5.0 parts by weight based on 100 parts by weight of the ink composition, and the viscosity modifier is selected from the group consisting of polyvinyl alcohol, casein, and carboxymethylcellulose, and contained in an amount from 0.1 to 10 parts by weight based on 100 parts by weight of the ink composition. The acid and the base are contained in an amount from 0.1 to 20 parts by weight based on 100 parts by weight of the ink composition, respectively, and the dispersing agent is contained in an amount from 0.1 to 5 parts by weight based on 100 parts by weight of the ink composition.

The foregoing and other objects and advantages are substantially realized by providing an ink cartridge for a wet-type image forming apparatus with an array head, including an ink composition comprising a colorant, a solvent, and a plurality of additives, wherein the plurality of additives are of the same type and have one or more hydrophilic groups and one or more hydrophobic groups. Each of the hydrophobic groups and the hydrophilic groups can be the same or different.

DETAILED DESCRIPTION OF INVENTION

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An ink composition according to an exemplary embodiment of the present invention includes a colorant, a solvent, and a plurality of additives. The plurality of additives are of the same type and have one or more hydrophilic groups and one or more hydrophobic groups. Preferably, either each of the one or more hydrophobic groups of the plurality of additives, or each of the one or more hydrophilic groups of the plurality of additives, or each of the one or more hydrophobic groups and each of the one or more hydrophilic groups of the plurality of additives, has the same structure.

Two or more of the same types of additives are added to the ink composition according to the exemplary embodiment of the present invention. The additive at least one component selected from the group consisting a defoaming agent, an emulsifier and a nozzle clogging inhibitor. For example, when the additive is the defoaming agent, two or more defoaming agents are added to the ink composition.

The additive should comprise one or more hydrophilic groups and one or more hydrophobic groups based on hydrophobic hydrocarbon. Preferably, in the different additives of the same type, either the hydrophilic groups or the hydrophobic groups should have the same structure.

The ink composition according to the exemplary embodiment of the present invention may have different hydrophobic hydrocarbon groups or different hydrophilic groups. Accordingly, when the ink does not move and a hydrophilic solvent is used, a portion having a large number of hydrocarbons or a portion having low hydrophilicity comes into contact with the air at the surface of the ink, and has significant influence on the surface tension as well as the properties of the additives. The properties of the additive include, for example, defoaming properties, dispersibility, and dry stability.

Additionally, since the ink composition according to the exemplary embodiment of the present invention may have the same hydrophilic groups or the same hydrophobic hydrocarbon groups, miscibility of the additives is improved so that the ink flows freely, drying at the nozzles is reduced, and the drying rate of the solvent increases, when the ink moves.

When the additive of the same structure has the hydrophobic group with the same structure, the structure of the additive is either the following Formula (I),

or the following Formula (II),

The additives of the same type can have the structure of Formula (I) or the structure of Formula (II).

In Formulae (I) and (II), $R^1$ and $R^2$ are each independently selected from the group consisting of a hydrogen atom, a substituted or unsubstituted $C_5$ to $C_{25}$ alkyl group, a substituted or unsubstituted $C_5$ to $C_{25}$ cyclic alkyl group, a substituted or unsubstituted $C_5$ to $C_{25}$ heteroalkyl group, a substituted or unsubstituted $C_5$ to $C_{25}$ alkenyl group, a substituted or unsubstituted $C_5$ to $C_{25}$ alkoxy group, a substituted or unsubstituted $C_5$ to $C_{25}$ alkylsulfonamide group, a substituted or unsubstituted $C_5$ to $C_{25}$ arylsulfonamide group, a substituted or unsubstituted $C_5$ to $C_{25}$ acylamino group, $C_5$ to $C_{25}$ alkylureido group, $C_6$ to $C_{26}$ arylureido group, $C_5$ to $C_{25}$ alkoxycarbonyl group, $C_5$ to $C_{25}$ alkoxycarbonylamino group, a carbamoyl group, a sulfamoyl group, a sulfo group or salts thereof, a carboxy group or salts thereof, a substituted or unsubstituted $C_1$ to $C_{20}$ hydroxyalkyloxyalkyl group, a substituted or unsubstituted $C_5$ to $C_{25}$ dialkylaminoalkyl group, a substituted or unsubstituted $C_5$ to $C_{25}$ pyridyl group, a substituted or unsubstituted $C_6$ to $C_{26}$ pyridylalkyl group, a substituted or unsubstituted $C_6$ to $C_{26}$ imidazolyl group, a hydrazine group, a hydrozone group, a substituted or unsubstituted $C_5$ to $C_{25}$ pyridylalkyl group, a substituted or unsubstituted $C_6$ to $C_{26}$ aryl group, a substituted or unsubstituted $C_6$ to $C_{26}$ arylalkyl group, a substituted or unsubstituted $C_6$ to $C_{26}$ heteroaryl group, $C_6$ to $C_{26}$ heteroarylalkyl group, a substituted or unsubstituted $C_6$ to $C_{26}$ heteroarylalkenyl group, and a substituted or unsubstituted $C_5$ to $C_{25}$ heterocycloalkyl group, but are not particularly limited thereto.

In Formulae (I) and (II), as a hydrophilic ionic group, X is exemplified by alkylcarboxylic acid salts, alcohol sulfonic acid ester salts, alkylsulfonic acid salts, alkylbenzenesulfonic acid salts, aliphatic amine salts, quaternary ammonium salts, sulfonium salts, and phosphonium salts. Also, as a hydrophilic non-ionic group, X may be selected from the group consisting of hydroxides, polyoxyethylene alkyl ethers, polyoxyethylene alkylphenyl ethers, polyoxyethylene secondary alcohol ethers, polyoxyethylene-oxypropylene block copolymer, polyglycerine fatty acid ester, sorbitan fatty acid ester, acetylenic polyalkylene oxide, and acetylenic diol, but is not particularly limited thereto.

When the additive of the same structure, which is added to the ink composition according to the exemplary embodiment of the present invention, has a hydrophilic group with the same structure, the structure of the additive is either the following Formula (III),

or the following Formula (IV),

The additive of the same type can have the structure of Formula (III) or the structure of Formula (IV).

In Formulae (III) and (IV), R is selected from the group consisting of a hydrogen atom, a substituted or unsubstituted $C_5$ to $C_{25}$ alkyl group, a substituted or unsubstituted $C_5$ to $C_{25}$ cyclic alkyl group, a substituted or unsubstituted $C_5$ to $C_{25}$ heteroalkyl group, a substituted or unsubstituted $C_5$ to $C_{25}$ alkenyl group, a substituted or unsubstituted $C_5$ to $C_{25}$ alkoxy group, a substituted or unsubstituted $C_5$ to $C_{25}$ alkylsulfonamide group, a substituted or unsubstituted $C_5$ to $C_{25}$ arylsulfonamide group, a substituted or unsubstituted $C_5$ to $C_{25}$ acylamino group, $C_5$ to $C_{25}$ alkylureido group, $C_6$ to $C_{26}$ arylureido group, $C_5$ to $C_{25}$ alkoxycarbonyl group, $C_5$ to $C_{25}$ alkoxycarbonylamino group, a carbamoyl group, a sulfamoyl group, a sulfo group or salts thereof, a carboxy group or salts thereof, a substituted or unsubstituted $C_1$ to $C_{20}$ hydroxyalkyloxyalkyl group, a substituted or unsubstituted $C_5$ to $C_{25}$ dialkylaminoalkyl group, a substituted or unsubstituted $C_5$ to $C_{25}$ pyridyl group, a substituted or unsubstituted $C_6$ to $C_{26}$ pyridylalkyl group, a substituted or unsubstituted $C_6$ to $C_{26}$ imidazolyl group, a hydrazine group, a hydrozone group, a substituted or unsubstituted $C_5$ to $C_{25}$ pyridylalkyl group, a substituted or unsubstituted $C_6$ to $C_{26}$ aryl group, a substituted or unsubstituted $C_6$ to $C_{26}$ arylalkyl group, a substituted or unsubstituted $C_6$ to $C_{26}$ heteroaryl group, $C_6$ to $C_{26}$ heteroarylalkyl group, a substituted or unsubstituted $C_6$ to $C_{26}$ heteroarylalkenyl group, and a substituted or unsubstituted $C_5$ to $C_{25}$ heterocycloalkyl group; and $X^1$ and $X^2$ are each independently selected from the group consisting of alkylcarboxylic acid salts, alcohol sulfonic acid ester salts, alkylsulfonic acid salts, alkylbenzenesulfonic acid salts, aliphatic amine salts, quaternary ammonium salts, sulfonium salts, phosphonium salts, hydroxides, polyoxyethylene alkyl ethers, polyoxyethylene alkylphenyl ethers, polyoxyethylene secondary alcohol ethers, polyoxyethylene-oxypropylene block copolymers, polyglycerine fatty acid esters, sorbitan fatty acid esters, acetylenic polyalkylene oxides, and acetylenic diols.

Examples of the alkyl group include pentyl, iso-amyl, hexyl, octyl, nonyl and decyl, but are not particularly limited thereto.

The term "heteroalkyl group" refers to an alkyl group, as described above, which contains a nitrogen atom, a sulfur atom, an oxygen atom, or a phosphorus atom. Examples of the heteroalkyl group include methoxy, ethoxy, propoxy, butoxy, t-butoxy, fluoromethoxy, chloromethoxy, trifluoromethoxy, trifluoroethoxy, fluoroethoxy and fluoropropoxy, but are not particularly limited thereto.

The term "alkenyl group" refers to an alkyl group, as described above, which contains a carbon-to-carbon double bond in the middle or at one end. Examples of the alkenyl group include ethylene, propylene, butylene, and hexylene, but are not particularly limited thereto.

The term "heteroaryl group" refers to monovalent monocyclic or bivalent bicyclic aromatic organic compounds containing 5 to 25 carbon atoms, in which 1, 2 or 3 heteroatoms selected from N, O, P, and S are contained, and remaining ring atoms are C.

The term "heteroarylalkyl group" refers to a heteroaryl group, as described above, in which part of the hydrogen is substituted with an alkyl group.

The term "aryl group", used alone or in combination with other terms, refers to a carbocyclic aromatic system containing 6 to 25 carbon atoms, which contain one or more rings which may be fused together or linked covalently using a pendant method. The term "aryl" includes aromatic radicals, such as phenyl, naphthyl, and tetrahydronaphthyl.

Examples of the aryl group include phenyl, naphthyl, and tetrahydronaphthyl, but are not particularly limited thereto. The aryl group may be substituted with a substituent selected from the group consisting of haloalkylene, nitro, cyano, alkoxy, or lower alkylamino. Furthermore, the arylalkyl group may be either benzyl or phenylethyl, but is not particularly limited thereto.

The term "arylalkyl group" refers to an aryl group, as defined above, in which part of the hydrogen is substituted with a lower alkyl radical, such as methyl, ethyl, or propyl.

The hydrogen atoms contained in the alkyl group, heteroalkyl group, alkenyl group, aryl group, arylalkyl group, heteroaryl group, and the heteroarylalkyl group, as described above, may be substituted with a halogen atom, a hydroxy group, a nitro group, a cyano group, an amino group, an amidino group, a hydrazine group, a hydrozone group, a carboxyl group acid or salts thereof, a sulfonic acid group or salts thereof, a phosphoric acid or salts thereof, a $C_5$ to $C_{25}$ alkyl group, a $C_5$ to $C_{25}$ alkenyl group, a $C_5$ to $C_{25}$ alkynyl group, a $C_5$ to $C_{25}$ heteroalkyl group, a $C_5$ to $C_{25}$ aryl group, a $C_6$ to $C_{26}$ arylalkyl group, a $C_6$ to $C_{26}$ heteroaryl group, or a $C_6$ to $C_{26}$ heteroarylalkyl group, respectively.

Preferably, the compound of Formula (I) has the following Formula (V),

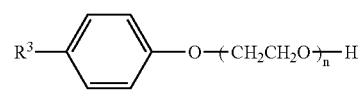

(V)

in which $R^3$ is a $C_1$ to $C_6$ alkyl group; and n is an integer from 1 to 50.

In another preferred embodiment the compound of Formula (I) has the following Formula (VI),

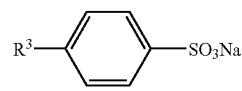

(VI)

in which $R^4$ is one of a hydrogen atom, a halogen atom, and a $C_1$ to $C_{20}$ alkyl group.

In one preferred embodiment the compound of Formula (II) has the following Formula (VII),

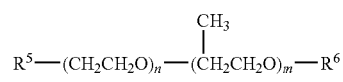

(VII)

in which $R^5$ and $R^6$ are each independently one of a hydrogen atom, a halogen atom, and a $C_1$ to $C_{20}$ alkyl group; n and m are integers from 0 to 50; and n+m is 1 or more.

In another preferred embodiment the compound of Formula (I) has the following Formula (VIII),

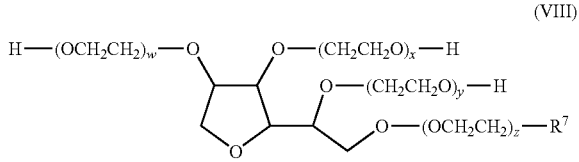

(VIII)

in which $R^7$ is a $C_1$ to $C_{20}$ alkyl group; and w+x+y+z is an integer from 1 to 100.

Preferably, the compound of Formula (III) has the following Formula (V),

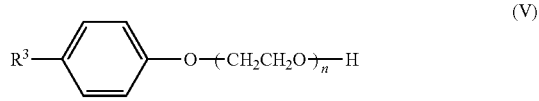

in which $R^3$ is a $C_1$ to $C_6$ alkyl group; and n is an integer from 1 to 50.

In another preferred embodiment the compound of Formula (IV) has the following Formula (VII),

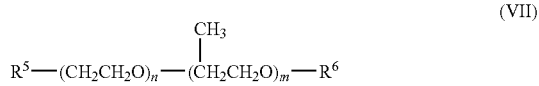

in which $R^5$ and $R^6$ are each independently one of a hydrogen atom, a halogen atom, and a $C_1$ to $C_{20}$ alkyl group; n and m are integers from 0 to 50; and n+m is 1 or more.

In another preferred embodiment the compound of Formula (III) has the following Formula (VIII),

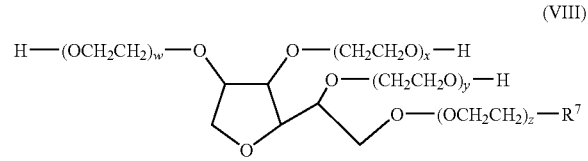

in which $R^7$ is a $C_1$ to $C_{20}$ alkyl group; and w+x+y+z is an integer from 1 to 100.

Preferably, Formula (IV) is the following Formula (IX),

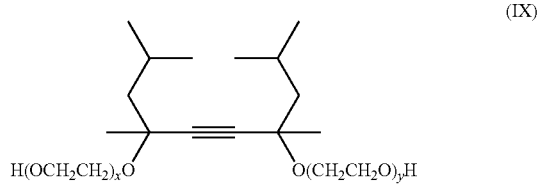

in which x and y are integers from 0 to 100.

In Formulae (I), (II), (III), and (IV), when X, $X^1$ and $X^2$ are non-ionic polymers, the polymer has 1 to 30 repeating units.

Preferably, the compounds of Formulae (I) and (III) comprise polyethyleneglycol- or polyoxyethylene-based compounds, and the compounds of Formulae (II) and (IV) comprise acetylene glycol- or acetylene alcohol-based compounds.

The plurality of additives is preferably contained in an amount from 0.1 to 20 parts by weight, and more preferably, 0.1 to 10 parts by weight based on 100 parts by weight of the ink composition. Preferably, the total content of the plurality of additives is 40 parts by weight or less based on 100 parts by weight of the ink composition.

A dye or a pigment may be used as the colorant contained in the ink composition of the exemplary embodiment of the present invention. The pigment may be a self-dispersing pigment which does not need the use of a dispersing agent.

The content of the colorant is preferably 0.5 to 10 parts by weight based on 100 parts by weight of the ink composition. If the content of the colorant is less than 0.5 parts by weight, color depth is low, and thus, it is difficult to embody colors. If the content of the colorant is more than 10 parts by weight, long-term storage stability including the prevention of nozzle clogging, is reduced.

An aqueous liquid medium such as water may be used as a solvent alone or in a mixture with one or more organic solvents. If a mixture of water with organic solvents is used, the viscosity and surface tension of the ink composition may be regulated within a desired range.

The solvent is preferably contained in an amount from 10 to 97 parts by weight based on 100 parts by weight of the ink composition, and the organic solvent is preferably contained in an amount from 2 to 60 parts by weight based on 100 parts by weight of the ink composition.

Examples of the organic solvent include alcohols, such as methyl alcohol, ethyl alcohol, n-propyl alcohol, isopropyl alcohol, n-butyl alcohol, sec-butyl alcohol, t-butyl alcohol, and isobutyl alcohol; polyhydric alcohols, such as ethylene glycol, diethylene glycol, trimethylolpropane glycerol, polyethylene glycol, and polypropylene glycol; ketones, such as acetone, methyl ethyl ketone, and diacetone alcohol; esters, such as ethyl acetate and ethyl lactate; lower alkyl ethers, such as ethylene glycol monomethyl ether, ethylene glycol monoethyl ether, diethylene glycol methyl ether, diethylene glycol ethyl ether, triethylene glycol monomethyl ether, and triethylene glycol monoethyl ether; nitrogen-containing compounds, such as 2-pyrolidone, N-methyl-2-pyrolidone, and caprolactam; dimethyl sulfoxide; tetramethylsulfone; and thioglycol, but are not particularly limited thereto.

The ink composition according to an exemplary embodiment of the present invention has a surface tension of 15 to 70 dyne/cm at 20° C., and a viscosity of 1.5 to 10 cps. If the surface tension of the ink composition is less than 15 dyne/cm at 20° C., the ink penetrates into the paper too rapidly during printing, and thus it is difficult to embody colors due to a decrease in color depth, and the dot size is too small when the ink discharged. If the surface tension of the ink composition is more than 70 dyne/cm at 20° C., the ink penetrates into the paper too slowly during printing, and thus the drying time is too lengthy and the fluidity of the ink composition is reduced.

Preferably, the ink composition according to another exemplary embodiment of the present invention may further include one or more of a surfactant, a viscosity modifier, an acid, a base, a dispersing agent, and a metal oxide.

Referring to the solvents, when the surfactant is added to the ink composition, the surfactant controls the surface tension of the ink composition to stabilize the ink discharge performance. An anionic surfactant or a non-ionic surfactant may be used as this solvent.

The surfactant is preferably contained in an amount from 0.1 to 5.0 parts by weight based on 100 parts by weight of the ink composition.

The viscosity modifier controls the viscosity of the ink composition to facilitate effective jetting. The viscosity modifier may be one selected from the group consisting of polyvinyl alcohol, casein, and carboxymethylcellulose, and is contained in an amount from 0.1 to 10 parts by weight based on 100 parts by weight of the ink composition.

The acid or the base increases the solubility of a wetting agent in the solvent and stabilizes the colorant. Contents of the acid and the base may be 0.1 to 20 parts by weight based on 100 parts by weight of the ink composition, respectively.

The dispersing agent allows the colorant and the additives contained in the ink composition to be dispersible, and includes, for example, a sodium salt of naphthalene sulfonic acid-formalin condensate (Demol N, manufactured by KAO Corporation). The content of the dispersing agent may be 0.1 to 5 parts by weight based on 100 parts by weight of the ink composition.

The ink composition according to the exemplary embodiment of the present invention is not particularly limited to the use thereof, and may be used in toner compositions, paints and coating solutions, in addition to the ink cartridge for printing with the wet-type image forming apparatus.

Another exemplary embodiment of the present invention provides an ink cartridge of a wet-type image forming apparatus with an array head, including an ink composition comprising a colorant, a solvent, and a plurality of additives. The plurality of additives are of the same type, and include one or more hydrophilic groups and one or more hydrophobic groups. Either each of the one or more hydrophobic groups of the plurality of additives, or each of the one or more hydrophilic groups of the plurality of additives, or each of the one or more hydrophobic groups and each of the one or more hydrophilic groups of the plurality of additives, has the same structure.

The ink composition of the exemplary embodiment of the present invention may be effectively used in a cartridge of a wet-type image forming apparatus with an array head.

In contrast to a shuttle-type image forming apparatus in which one chip is transferred to be printed, high-speed printing in a wet-type image forming apparatus with an array head is performed by using a plurality of chips, so that the amount of a printer to be processed may be increased.

As more nozzles are used in the wet-type image forming apparatus, small ink droplets are ejected to form smaller dots, and the volume of the ink droplets is 18 pl or less because the speed is very fast. In order to embody images without bleeding between colors even during high-speed printing, it is advantageous to use an ink composition having excellent resistance to bleeding. Therefore, an ink set of the exemplary embodiment of the present invention is useful particularly in a wet-type image forming apparatus with an array head, which uses 10,000 or more nozzles.

The present invention will be described in more detail by presenting the following Examples. These examples are for illustrative purposes only, and are not intended to limit the scope of the present invention. The following tests were used to evaluate the properties of the ink composition which is used in the wet-type image forming apparatus. The tests may also be applied to wet-type toners, dry-type toners, coatings and/or coating solutions. The following Examples will be described as a representative embodiment of the ink composition according to an exemplary embodiment of the present invention. However, this is not meant to limit the scope of the present invention.

EXAMPLES

An ink composition according to an exemplary embodiment of the present invention is prepared in the following methods.

To a solvent, were mixed a colorant, a surfactant and a defoaming agent according to the exemplary embodiment of the present invention with other additives, and then the mixture was sufficiently stirred by a stirrer until homogeneous.

The resulting mixture is filtered through a filter to obtain the ink composition according to the exemplary embodiment of the present invention.

In Examples 1 to 5, the ink composition according to the exemplary embodiment of the present invention is prepared in accordance with the preparation method described above, based on the content of the following raw materials.

Example 1

4.0 g of a dye (C.I. Direct Yellow 86); an additive consisting of 1.5 g of a compound represented by Formula (V), wherein n is an integer of 3 and $R^3$ is nonyl and 1 g of a compound represented by Formula (V), wherein n is an integer of 30 and $R^3$ is nonyl; 69.5 g of water; 8.0 g of PEG 200 (manufactured by Kanto Chemical Co.); 7.0 g of trimethylolpropane; and 9.0 g of glycerine were mixed, and the mixture was sufficiently stirred in a stirrer for 30 minutes or more until homogeneous. Then, the resulting mixture was passed through a 0.45 µm filter to obtain an ink composition.

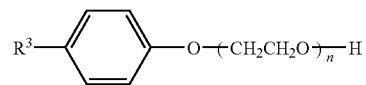

Formula (V)

Example 2

4.0 g of a dye (C.I. Direct Yellow 132); an additive consisting of 0.02 g of a compound represented by Formula (VI), wherein $R^4$ is chlorine and 0.2 g of a compound represented by Formula (VI), wherein $R^4$ is a $C_{12}$ alkyl group; 69.72 g of water; 2 g of acetylene glycol; 8.0 g of PEG 200 (manufactured by Kanto Chemical Co.); 7.0 g of trimethylolpropane; and 9.0 g of glycerine were mixed, and the mixture was sufficiently stirred in a stirrer for 30 minutes or more until homogeneous. Then, the resulting mixture was passed through a 0.45 µm filter to obtain an ink composition.

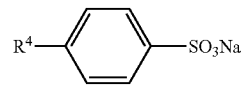

Formula (VI)

Example 3

4.0 g of a dye (C.I. Direct Magenta 227); an additive consisting of 2 g of a compound represented by Formula (VII), wherein $R^5$ is a hydroxide group, $R^6$ is a $C_{12}$ alkyl group, and n and m are each an integer of 10 and 2 g of a compound represented by Formula (VII), wherein $R^5$ and $R^6$ are each $C_{12}$ alkyl groups, and n and m are each an integer of 10; 68 g of water; 8.0 g of PEG 200 (manufactured by Kanto Chemical Co.); 7.0 g of trimethylolpropane; and 9.0 g of glycerine were mixed, and the mixture was sufficiently stirred in a stirrer for 30 minutes or more until homogeneous. Then, the resulting mixture was passed through a 0.45 µm filter to obtain an ink composition.

Formula (VII)

$$R^5-(CH_2CH_2O)_n-(\overset{CH_3}{\underset{|}{CH}}CH_2O)_m-R^6$$

Example 4

5.0 g of a dye (C.I. Direct Blue 199); an additive consisting of 0.01 g of a compound represented by Formula (VIII), wherein w+x+y+z is an integer of 20, and $R^7$ is a $C_{11}$ alkyl group and 0.01 g of a compound represented by Formula (VIII), wherein w+x+y+z is an integer of 20, and $R^7$ is a $C_{17}$ alkyl group; 66.92 g of water; 2 g of acetylene glycol; 8.0 g of PEG 200 (manufactured by Kanto Chemical Co.); 7.0 g of trimethylolpropane; and 9.0 g of glycerine were mixed, and the mixture was sufficiently stirred in a stirrer for 30 minutes or more until homogeneous. Then, the resulting mixture was passed through a 0.45 μm filter to obtain an ink composition.

Formula (VIII)

$$H-(OCH_2CH_2)_w-O \quad O-(CH_2CH_2O)_x-H$$
$$O-(CH_2CH_2O)_y-H$$
$$O-(OCH_2CH_2)_z-R^7$$

Example 5

4.0 g of carbon black (RAVEN 5250, manufactured by COLUMBIAN CO.); an additive consisting of 0.6 g of an acetylene glycol-based compound represented by Formula (IX), wherein x+y is an integer of 3 to 4 and 1 g of an acetylene glycol-based compound represented by Formula (IX), wherein x+y an integer of is 30; 70.4 g of water; 8.0 g of diethylene glycol; 8.0 g of trimethylolpropane; and 8.0 g of glycerine were mixed, and the mixture was sufficiently stirred in a stirrer for 30 minutes or more until homogeneous. Then, the resulting mixture was passed through a 0.45 μm filter to obtain an ink composition.

Formula (IX)

$$H(OCH_2CH_2)_xO \quad\quad O(CH_2CH_2O)_yH$$

COMPARATIVE EXAMPLE

In Comparative Examples, ink compositions were produced in the same manner as in Examples described above, except that one type of the conventional additive was used.

Comparative Example 1

An ink composition was produced in the same composition and the same manner as in Example 1, except that Tergitol 15-S-3 (trademark, manufactured by The Lab Depot, Inc.) was used as an additive.

Comparative Example 2

An ink composition was produced in the same composition and the same manner as in Example 2, except that chlorobenzene sulfonic acid sodium salt was used as an additive.

Comparative Example 3

An ink composition was produced in the same composition and the same manner as in Example 3, except that Genapol 2822 (trademark, manufactured by Clariant) was used as an additive.

Comparative Example 4

An ink composition was produced in the same composition and the same manner as in Example 4, except that Polysorbate 80 was used as an additive.

Comparative Example 5

An ink composition was produced in the same composition and the same manner as in Example 5, except that Sulfynol 104 (trademark, manufactured by Air Products and Chemicals, Inc.) was used as an additive.

Evaluation

The properties of the ink compositions obtained from Examples 1 to 5 and Comparative Examples 1 to 5 were evaluated according to the following methods.

1) Test of Long-Term Storage Stability 100 ml of the ink compositions obtained from Examples 1 to 5 and Comparative Examples 1 to 5 were each placed in heat resistant glass bottles, hermetically sealed, and then stored at 60° C. in an incubator. The bottles were left for 2 months, and then it was confirmed whether precipitates had formed at the bottoms of the bottles and evaluated as follows. The results are shown in Table 1.

※ Evaluation Standards
○: No precipitate
x: Precipitated

2) Test of Nozzle Clogging

The ink compositions obtained from Examples 1 to 5 and Comparative Examples 1 to 5 were each charged into an ink cartridge and placed at room temperature (25° C.) and at a low temperature (−18° C.) for two weeks. Then, the degree of nozzle clogging was evaluated based on the amount of ink printed out from the cartridge when printing, as follows. The results are shown in Table 1.

※ Evaluation Standards
○: Nozzle clogging is not observed.
Δ: Nozzle clogging in 1 to 2 nozzles.
x: Nozzle clogging in 3 or more nozzles.

3) Test of Defoaming Properties

In the following experiment, the bubble height ratio, which is a measurement of defoaming properties and is not affected by the degree of bubble generation, was calculated using the following Equation. The results are shown in Table 1.

$$\text{bubble height ratio (\%)}=(H/H_o)\times 100 \quad\quad\quad \text{[Equation 1]}$$

in which H is the height of bubbles at 5 minutes after bubble generation, and $H_o$ is the height of bubbles at 20 seconds after bubble generation.

If the contact angle between the ink flow passage forming material and the aqueous ink composition is low, the initial discharge capacity of the ink composition into a printer head is high. The contact angle is generally related to the surface tension of the aqueous ink composition. To obtain a high initial discharge capacity, surface tension of the ink composition of 40 mN/m or less and a bubble height ratio (the height at 5 minutes/height at 20 seconds after bubble generation) of 0.3 or less are required. At this time, in the aqueous ink composition with the defoaming properties, there is a large difference between the height of bubbles at 5 minutes and the height of bubbles at 20 seconds after bubble generation.

※ Evaluation Standards
○: bubble height ratio (%)<0.3
×: bubble height ratio (%)>0.3

4) Test of Resistance to Bleeding

The ink compositions obtained from Examples 1 to 5 and Comparative Examples 1 to 5 were each refilled into an ink cartridge, and test patterns were then printed together with color inks using a printer (MJC-2400C, manufactured by SAMSUNG). After 30 minutes, the positions of dot lines in which color mixing occurred at the boundary line between two adjacent colors were measured under a microscope. The following evaluation standards are disclosed in U.S. Pat. No. 5,854,307. The results are shown in Table 1.

※ Evaluation Standards
5: No color mixing occurred at the boundary line.
4: Color mixing occurred over a width corresponding to a diameter of 1 dot.
3: Color mixing occurred over a width corresponding to diameters of 2 dots.
2: Color mixing occurred over a width corresponding to diameters of 3 dots.
1: Color mixing occurred over a width corresponding to diameters of 4 dots or more (based on 600 dpi, a diameter of 1 dot=100 μm).

TABLE 1

| Items | Long-Term Storage Stability | Nozzle Clogging Room temp. | Nozzle Clogging Low temp. | Defoaming Property | Resistance to Bleeding |
|---|---|---|---|---|---|
| Example 1 | ○ | ○ | ○ | ○ | 4 |
| Example 2 | ○ | ○ | ○ | ○ | 5 |
| Example 3 | ○ | ○ | ○ | ○ | 5 |
| Example 4 | ○ | ○ | ○ | ○ | 5 |
| Example 5 | ○ | ○ | ○ | ○ | 5 |
| Comparative Example 1 | x | Δ | ○ | x | 3 |
| Comparative Example 2 | x | x | x | x | 2 |
| Comparative Example 3 | ○ | ○ | ○ | Δ | 2 |
| Comparative Example 4 | x | Δ | x | Δ | 3 |
| Comparative Example 5 | x | ○ | x | x | 3 |

The results of the long-term storage stability test in Table 1 show that while there were no precipitates in any of the ink compositions obtained from Examples 1 to 5, precipitates formed in the ink compositions obtained from Comparative Examples 2, 3 and 5. From the results, it was confirmed that the ink compositions obtained from Examples 1 to 5 including additives according to the exemplary embodiment of the present invention had superior storage stability compared to the ink compositions obtained from Comparative Examples 2, 3 and 5.

Additionally, in the test of nozzle clogging, while no nozzle clogging was observed in any nozzles for the ink compositions obtained from Examples 1 to 5, nozzle clogging was observed for Comparative Examples 1, 2, 4 and 5. In the test of defoaming properties, it was confirmed that defoaming properties were improved when the ink compositions obtained from Examples 1 to 5 were used compared to ink compositions obtained from Comparative Examples 1 to 5.

When the ink compositions obtained from Examples 1 to 5 were used, it was confirmed that the ink compositions of Examples 1 to 5 had superior resistance to bleeding compared to the ink compositions obtained from Comparative Examples 1 to 5.

The ink compositions obtained from Comparative Examples 1 to 5 were excellent in one test, but poor in the other tests, while the ink compositions according to the exemplary embodiment of the present invention were excellent in all of the tests. Therefore, it was confirmed that the ink compositions according to the exemplary embodiment of the present invention were superior to the ink compositions obtained from Comparative Examples 1 to 5.

As described above, the ink composition according to the exemplary embodiment of the present invention has excellent storage stability, particularly long-term storage stability, good defoaming properties, and improved resistance to bleeding on the print paper during image forming, while preventing clogging at the nozzle, through which the ink composition is ejected, when images are printed in a wet-type image forming apparatus using the ink composition. Therefore, it is possible to obtain printed images of a high quality.

As aforementioned, the exemplary embodiments of the present invention are shown and described, but the present invention is not limited to the specific embodiments described above, and can be implemented in various modifications by those skilled in the art to which the present invention pertains without departing from the scope of the invention as defined by the appended claims and the full scope of equivalents thereof.

What is claimed is:

1. An ink composition comprising a colorant, a solvent, and a plurality of different additives,
    wherein the plurality of different additives are of the same type and have one or more hydrophilic groups and one or more hydrophobic groups; and wherein
    each of the one or more hydrophobic groups of the plurality of additives have the same structure and the hydrophilic groups have a different structure,
    each of the one or more hydrophilic groups of the plurality of additives have the same structure and the hydrophobic groups have a different structure, or
    each of the one or more hydrophobic groups and each of the one or more hydrophilic groups of the plurality of additives have the same structure, where the plurality of additives have the Formula II $R^1-X-R^2$, or $X^1-R-X^2$,                    Formula IV in which R, $R^1$ and $R^2$ are selected from the group consisting of a hydrogen atom, a substituted or unsubstituted $C_5$ to $C_{25}$ alkyl group, a substituted or unsubstituted $C_5$ to $C_{25}$ cyclic alkyl group, a substituted or unsubstituted $C_5$ to $C_{25}$ heteroalkyl group, a substituted or unsubstituted $C_5$ to $C_{25}$ alkenyl group, a substituted or unsubstituted $C_5$ to $C_{25}$ alkoxy group, a substituted or unsubstituted $C_5$ to $C_{25}$ alkylsulfonamide group, a substituted or unsubstituted $C_5$ to $C_{25}$ arylsulfonamide group, a substituted or unsubstituted $C_5$ to $C_{25}$ acylamino group, $C_5$ to $C_{25}$ alkylureido group, $C_6$ to $C_{26}$ arylureido group, $C_5$ to $C_{25}$ alkoxycarbonyl group, $C_5$ to $C_{25}$ alkoxycarbonylamino group, a carbamoyl group, a sulfamoyl group, a sulfo group or salts thereof, a carboxy group or salts thereof, a substituted or unsubstituted $C_1$ to $C_{20}$ hydroxyalkyloxyalkyl group, a substituted or unsubstituted $C_5$ to $C_{25}$ dialkylaminoalkyl group, a substituted or unsubstituted $C_5$ to $C_{25}$ pyridyl group, a substituted or unsubstituted $C_6$ to $C_{26}$ pyridylalkyl group, a substituted or unsubstituted $C_6$ to $C_{26}$ imidazolyl group, a hydrazine group, a hydrozone group, a substituted or unsubstituted $C_5$ to $C_{25}$ pyridylalkyl group, a substituted or unsubstituted $C_6$ to $C_{26}$ aryl group, a substituted or unsubstituted $C_6$ to $C_{26}$ arylalkyl group, a substituted or unsubstituted $C_6$ to $C_{26}$ heteroaryl group, $C_6$ to $C_{26}$ heteroarylalkyl group, a substituted or unsubstituted $C_6$ to $C_{26}$ heteroarylalkenyl group, and a substituted or unsubstituted $C_5$ to $C_{25}$ heterocycloalkyl group; and X, $X^1$ and $X^2$ are each independently selected from the group consisting of alkylcarboxylic acid salts, alcohol sulfonic acid ester salts, alkylsulfonic acid salts, alkylbenzenesulfonic acid salts, aliphatic amine salts, quaternary ammonium salts, sulfonium salts, phosphonium salts, hydroxides, polyglycerine fatty acid esters, sorbitan fatty acid esters, acetylenic polyalkylene oxides, and acetylenic diols.

2. The ink composition as claimed in claim 1, wherein the additive is selected from the consisting of a defoaming agent, an emulsifier and a nozzle clogging inhibitor.

3. An ink composition comprising a colorant, a solvent, and a plurality of different additives, wherein the plurality of different additives are of the same type and have one or more hydrophilic groups and one or more hydrophobic groups, and wherein the additives have one or more hydrophobic groups of the same structure and the hydrophilic groups have a different structure, one or more hydrophilic groups of the same structure and the hydrophobic groups have a different structure, or one or more hydrophobic groups and one or more hydrophilic groups have the same structure, wherein the plurality of additives have at least one hydrophobic group with the same structure, the additive being either the following Formula (I),

$$X—R^1 \qquad (I)$$

or the following Formula (II),

$$R^1—X—R^2 \qquad (II),$$

in which $R^1$ and $R^2$ are each independently selected from the group consisting of a hydrogen atom, a substituted or unsubstituted $C_5$ to $C_{25}$ alkyl group, a substituted or unsubstituted $C_5$ to $C_{25}$ cyclic alkyl group, a substituted or unsubstituted $C_5$ to $C_{25}$ heteroalkyl group, a substituted or unsubstituted $C_5$ to $C_{25}$ alkenyl group, a substituted or unsubstituted $C_5$ to $C_{25}$ alkoxy group, a substituted or unsubstituted $C_5$ to $C_{25}$ alkylsulfonamide group, a substituted or unsubstituted $C_5$ to $C_{25}$ arylsulfonamide group, a substituted or unsubstituted $C_5$ to $C_{25}$ acylamino group, $C_5$ to $C_{25}$ alkylureido group, $C_6$ to $C_{26}$ arylureido group, $C_5$ to $C_{25}$ alkoxycarbonyl group, $C_5$ to $C_{25}$ alkoxycarbonylamino group, a carbamoyl group, a sulfamoyl group, a sulfo group or salts thereof, a carboxy group or salts thereof, a substituted or unsubstituted $C_1$ to $C_{20}$ hydroxyalkyloxyalkyl group, a substituted or unsubstituted $C_5$ to $C_{25}$ dialkylaminoalkyl group, a substituted or unsubstituted $C_5$ to $C_{25}$ pyridyl group, a substituted or unsubstituted $C_6$ to $C_{26}$ pyridylalkyl group, a substituted or unsubstituted $C_6$ to $C_{26}$ imidazolyl group, a hydrazine group, a hydrozone group, a substituted or unsubstituted $C_5$ to $C_{25}$ pyridylalkyl group, a substituted or unsubstituted $C_6$ to $C_{26}$ aryl group, a substituted or unsubstituted $C_6$ to $C_{26}$ arylalkyl group, a substituted or unsubstituted $C_6$ to $C_{26}$ heteroaryl group, $C_6$ to $C_{26}$ heteroarylalkyl group, a substituted or unsubstituted $C_6$ to $C_{26}$ heteroarylalkenyl group, and a substituted or unsubstituted $C_5$ to $C_{25}$ heterocycloalkyl group; and X is selected from the group consisting of alkylcarboxylic acid salts, alcohol sulfonic acid ester salts, alkylsulfonic acid salts, alkylbenzenesulfonic acid salts, aliphatic amine salts, quaternary ammonium salts, sulfonium salts, phosphonium salts, hydroxides, polyglycerine fatty acid esters, sorbitan fatty acid esters, acetylenic polyalkylene oxides, and acetylenic diols.

4. An ink composition comprising a colorant, a solvent, and a plurality of different additives, wherein the plurality of different additives are of the same type and have one or more hydrophilic groups and one or more hydrophobic groups, and wherein the additives have one or more hydrophobic groups of the same structure and the hydrophilic groups have a different structure, one or more hydrophilic groups of the same structure and the hydrophobic groups have a different structure, or one or more hydrophobic groups and one or more hydrophilic groups have the same structure, wherein the plurality of additives have at least one hydrophilic group with the same structure, the additive being either the following Formula (III),

$$R—X^1 \qquad (III)$$

or the following Formula (IV),

$$X^1—R—X^2 \qquad (IV),$$

in which R is selected from the group consisting of a hydrogen atom, a substituted or unsubstituted $C_5$ to $C_{25}$ alkyl group, a substituted or unsubstituted $C_5$ to $C_{25}$ cyclic alkyl group, a substituted or unsubstituted $C_5$ to $C_{25}$ heteroalkyl group, a substituted or unsubstituted $C_5$ to $C_{25}$ alkenyl group, a substituted or unsubstituted $C_5$ to $C_{25}$ alkoxy group, a substituted or unsubstituted $C_5$ to $C_{25}$ alkylsulfonamide group, a substituted or unsubstituted $C_5$ to $C_{25}$ arylsulfonamide group, a substituted or unsubstituted $C_5$ to $C_{25}$ acylamino group, $C_5$ to $C_{25}$ alkylureido group, $C_6$ to $C_{26}$ arylureido group, $C_5$ to $C_{25}$ alkoxycarbonyl group, $C_5$ to $C_{25}$ alkoxycarbonylamino group, a carbamoyl group, a sulfamoyl group, a sulfo group or salts thereof, a carboxy group or salts thereof, a substituted or unsubstituted $C_1$ to $C_{20}$ hydroxyalkyloxyalkyl group, a substituted or unsubstituted $C_5$ to $C_{25}$ dialkylaminoalkyl group, a substituted or unsubstituted $C_5$ to $C_{25}$ pyridyl group, a substituted or unsubstituted $C_6$ to $C_{26}$ pyridylalkyl group, a substituted or unsubstituted $C_6$ to $C_{26}$ imidazolyl group, a hydrazine group, a hydrozone group, a substituted or unsubstituted $C_5$ to $C_{25}$ pyridylalkyl group, a substituted or unsubstituted $C_6$ to $C_{26}$ aryl group, a substituted or unsubstituted $C_6$ to $C_{26}$ arylalkyl group, a substituted or unsubstituted $C_6$ to $C_{26}$ heteroaryl group, $C_6$ to $C_{26}$ heteroarylalkyl group, a substituted or unsubstituted $C_6$ to $C_{26}$ heteroarylalkenyl group, and a substituted or unsubstituted $C_5$ to $C_{25}$ heterocycloalkyl group; and $X^1$ and $X^2$ are each independently selected from the group consisting of alkylcarboxylic acid salts, alcohol sulfonic acid ester salts, alkylsulfonic acid salts, alkylbenzenesulfonic acid salts, aliphatic amine salts, quaternary ammonium salts, sulfonium salts, phosphonium salts, hydroxides, polyglycerine fatty acid esters, sorbitan fatty acid esters, acetylenic polyalkylene oxides, and acetylenic diols.

5. The ink composition as claimed in claim 3, wherein the unsubstituted $C_5$ to $C_{25}$ alkyl group is selected from the group consisting of pentyl, iso-amyl, hexyl, octyl, nonyl and decyl, and the hydrogen atom contained in the alkyl group is substituted with a halogen atom, a hydroxy group, a nitro group, a cyano group, an amino group, an amidino group, a hydrazine group, a hydrazone group, a carboxyl group or salts thereof, a sulfonic acid group or salts thereof, a phosphoric acid group or salts thereof, a $C_5$ to $C_{25}$ alkyl group, a $C_5$ to $C_{25}$ alkenyl group, a $C_5$ to $C_{25}$ alkynyl group, a $C_5$ to $C_{25}$ heteroalkyl group, a $C_5$ to $C_{25}$ aryl group, a $C_6$ to $C_{26}$ arylalkyl group, a $C_6$ to $C_{26}$ heteroaryl group, or a $C_6$ to $C_{26}$ heteroarylalkyl group.

6. The ink composition as claimed in claim 3, wherein the heteroalkyl group is selected from the group of methoxy, ethoxy, propoxy, butoxy, t-butoxy, fluoromethoxy, chloromethoxy, trifluoromethoxy, trifluoroethoxy, fluoroethoxy and fluoropropoxy, and the hydrogen atom contained in the heteroalkyl group is substituted with a halogen atom, a hydroxy group, a nitro group, a cyano group, an amino group, an amidino group, a hydrazine group, a hydrazone group, a carboxyl group or salts thereof, a sulfonic acid group or salts thereof, a phosphoric acid group or salts thereof, a $C_5$ to $C_{25}$ alkyl group, a $C_5$ to $C_{25}$ alkenyl group, a $C_5$ to $C_{25}$ alkynyl group, a $C_5$ to $C_{25}$ heteroalkyl group, a $C_5$ to $C_{25}$ aryl group, a $C_6$ to $C_{26}$ arylalkyl group, a $C_6$ to $C_{26}$ heteroaryl group, or a $C_6$ to $C_{26}$ heteroarylalkyl group.

7. The ink composition as claimed in claim 3, wherein the unsubstituted $C_5$ to $C_{25}$ alkenyl group is selected from the group of ethylene, propylene, butylene, and hexylene, and the hydrogen atom contained in the alkenyl group is substituted with a halogen atom, a hydroxy group, a nitro group, a cyano group, an amino group, an amidino group, a hydrazine group, a hydrazone group, a carboxyl group or salts thereof, a sulfonic acid group or salts thereof, a phosphoric acid group or salts thereof, a $C_5$ to $C_{25}$ alkyl group, a $C_5$ to $C_{25}$ alkenyl group, a $C_5$ to $C_{25}$ alkynyl group, a $C_5$ to $C_{25}$ heteroalkyl group, a $C_5$ to $C_{25}$ aryl group, a $C_6$ to $C_{26}$ arylalkyl group, a $C_6$ to $C_{26}$ heteroaryl group, or a $C_6$ to $C_{26}$ heteroarylalkyl group.

8. The ink composition as claimed in claim 3, wherein the aryl group is selected from the group consisting of phenyl, naphthyl, and tetrahydronaphthyl, and substituted with a substituent selected from the group consisting of haloalkylene, nitro, cyano, alkoxy and lower alkylamino, and the hydrogen atom contained in the aryl group is substituted with a halogen atom, a hydroxy group, a nitro group, a cyano group, an amino group, an amidino group, a hydrazine group, a hydrazone group, a carboxyl group or salts thereof, a sulfonic acid group or salts thereof, a phosphoric acid group or salts thereof, a $C_5$ to $C_{25}$ alkyl group, a $C_5$ to $C_{25}$ alkenyl group, a $C_5$ to $C_{25}$ alkynyl group, a $C_5$ to $C_{25}$ heteroalkyl group, a $C_5$ to $C_{25}$ aryl group, a $C_6$ to $C_{26}$ arylalkyl group, a $C_6$ to $C_{26}$ heteroaryl group, or a $C_6$ to $C_{26}$ heteroarylalkyl group.

9. The ink composition as claimed in claim 3, wherein the arylalkyl group is either benzyl or phenylethyl, and the hydrogen atom contained in the arylalkyl group is substituted with a halogen atom, a hydroxy group, a nitro group, a cyano group, an amino group, an amidino group, a hydrazine group, a hydrazone group, a carboxyl group or salts thereof, a sulfonic acid group or salts thereof, a phosphoric acid group or salts thereof, a $C_5$ to $C_{25}$ alkyl group, a $C_5$ to $C_{25}$ alkenyl group, a $C_5$ to $C_{25}$ alkynyl group, a $C_5$ to $C_{25}$ heteroalkyl group, a $C_5$ to $C_{25}$ aryl group, a $C_6$ to $C_{26}$ arylalkyl group, a $C_6$ to $C_{26}$ heteroaryl group, or a $C_6$ to $C_{26}$ heteroarylalkyl group.

10. The ink composition as claimed in claim 3, wherein the hydrogen atom contained in one or more of the heteroaryl group and the heteroarylalkyl group is substituted with a halogen atom, a hydroxy group, a nitro group, a cyano group, an amino group, an amidino group, a hydrazine group, a hydrazone group, a carboxyl group or salts thereof, a sulfonic acid group or salts thereof, a phosphoric acid group or salts thereof, a $C_5$ to $C_{25}$ alkyl group, a $C_5$ to $C_{25}$ alkenyl group, a $C_5$ to $C_{25}$ alkynyl group, a $C_5$ to $C_{25}$ heteroalkyl group, a $C_5$ to $C_{25}$ aryl group, a $C_6$ to $C_{26}$ arylalkyl group, a $C_6$ to $C_{26}$ heteroaryl group, or a $C_6$ to $C_{26}$ heteroarylalkyl group.

11. The ink composition as claimed in claim 4, wherein the unsubstituted $C_5$ to $C_{25}$ alkyl group is selected from the group consisting of pentyl, iso-amyl, hexyl, octyl, nonyl and decyl, and the hydrogen atom contained in the alkyl group is substituted with a halogen atom, a hydroxy group, a nitro group, a cyano group, an amino group, an amidino group, a hydrazine group, a hydrazone group, a carboxyl group or salts thereof, a sulfonic acid group or salts thereof, a phosphoric acid group or salts thereof, a $C_5$ to $C_{25}$ alkyl group, a $C_5$ to $C_{25}$ alkenyl group, a $C_5$ to $C_{25}$ alkynyl group, a $C_5$ to $C_{25}$ heteroalkyl group, a $C_5$ to $C_{25}$ aryl group, a $C_6$ to $C_{26}$ arylalkyl group, a $C_6$ to $C_{26}$ heteroaryl group, or a $C_6$ to $C_{26}$ heteroarylalkyl group.

12. The ink composition as claimed in claim 4, wherein the heteroalkyl group is selected from the group of methoxy, ethoxy, propoxy, butoxy, t-butoxy, fluoromethoxy, chloromethoxy, trifluoromethoxy, trifluoroethoxy, fluoroethoxy and fluoropropoxy, and the hydrogen atom contained in the heteroalkyl group is substituted with a halogen atom, a hydroxy group, a nitro group, a cyano group, an amino group, an amidino group, a hydrazine group, a hydrazone group, a carboxyl group or salts thereof, a sulfonic acid group or salts thereof, a phosphoric acid group or salts thereof, a $C_5$ to $C_{25}$ alkyl group, a $C_5$ to $C_{25}$ alkenyl group, a $C_5$ to $C_{25}$ alkynyl group, a $C_5$ to $C_{25}$ heteroalkyl group, a $C_5$ to $C_{25}$ aryl group, a $C_6$ to $C_{26}$ arylalkyl group, a $C_6$ to $C_{26}$ heteroaryl group, or a $C_6$ to $C_{26}$ heteroarylalkyl group.

13. The ink composition as claimed in claim 4, wherein the unsubstituted $C_5$ to $C_{25}$ alkenyl group is selected from the group of ethylene, propylene, butylene, and hexylene, and the hydrogen atom contained in the alkenyl group is substituted with a halogen atom, a hydroxy group, a nitro group, a cyano group, an amino group, an amidino group, a hydrazine group, a hydrazone group, a carboxyl group or salts thereof, a sulfonic acid group or salts thereof, a phosphoric acid group or salts thereof, a $C_5$ to $C_{25}$ alkyl group, a $C_5$ to $C_{25}$ alkenyl group, a $C_5$ to $C_{25}$ alkynyl group, a $C_5$ to $C_{25}$ heteroalkyl group, a $C_5$ to $C_{25}$ aryl group, a $C_6$ to $C_{26}$ arylalkyl group, a $C_6$ to $C_{26}$ heteroaryl group, or a $C_6$ to $C_{26}$ heteroarylalkyl group.

14. The ink composition as claimed in claim 4, wherein the aryl group is selected from the group consisting of phenyl, naphthyl, and tetrahydronaphthyl, and substituted with a substituent selected from the group consisting of haloalkylene, nitro, cyano, alkoxy and lower alkylamino, and the hydrogen atom contained in the aryl group is substituted with a halogen atom, a hydroxy group, a nitro group, a cyano group, an amino group, an amidino group, a hydrazine group, a hydrazone group, a carboxyl group or salts thereof, a sulfonic acid group or salts thereof, a phosphoric acid group or salts thereof, a $C_5$ to $C_{25}$ alkyl group, a $C_5$ to $C_{25}$ alkenyl group, a $C_5$ to $C_{25}$ alkynyl group, a $C_5$ to $C_{25}$ heteroalkyl group, a $C_5$ to $C_{25}$ aryl group, a $C_6$ to $C_{26}$ arylalkyl group, a $C_6$ to $C_{26}$ heteroaryl group, or a $C_6$ to $C_{26}$ heteroarylalkyl group.

15. The ink composition as claimed in claim 4, wherein the arylalkyl group is either benzyl or phenylethyl, and the hydrogen atom contained in the arylalkyl group is substituted with a halogen atom, a hydroxy group, a nitro group, a cyano group, an amino group, an amidino group, a hydrazine group, a hydrazone group, a carboxyl group or salts thereof, a sulfonic acid group or salts thereof, a phosphoric acid group or salts thereof, a $C_5$ to $C_{25}$ alkyl group, a $C_5$ to $C_{25}$ alkenyl group, a $C_5$ to $C_{25}$ alkynyl group, a $C_5$ to $C_{25}$ heteroalkyl group, a $C_5$ to $C_{25}$ aryl group, a $C_6$ to $C_{26}$ arylalkyl group, a $C_6$ to $C_{26}$ heteroaryl group, or a $C_6$ to $C_{26}$ heteroarylalkyl group.

16. The ink composition as claimed in claim 4, wherein the hydrogen atom contained in one or more of the heteroaryl group and the heteroarylalkyl group is substituted with a halogen atom, a hydroxy group, a nitro group, a cyano group, an amino group, an amidino group, a hydrazine group, a hydrazone group, a carboxyl group or salts thereof, a sulfonic acid group or salts thereof, a phosphoric acid group or salts thereof, a $C_5$ to $C_{25}$ alkyl group, a $C_5$ to $C_{25}$ alkenyl group, a $C_5$ to $C_{25}$ alkynyl group, a $C_5$ to $C_{25}$ heteroalkyl group, a $C_5$ to $C_{25}$ aryl group, a $C_6$ to $C_{26}$ arylalkyl group, a $C_6$ to $C_{26}$ heteroaryl group, or a $C_6$ to $C_{26}$ heteroarylalkyl group.

17. The ink composition as claimed in claim 3, wherein Formula (I) is the following Formula (VI),

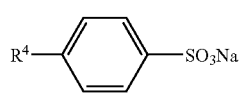
(VI)

in which $R^4$ is one of a hydrogen atom, a halogen atom and a $C_1$ to $C_{20}$ alkyl group.

18. The ink composition as claimed in claim 3, wherein Formula (II) is the following Formula (VIII),

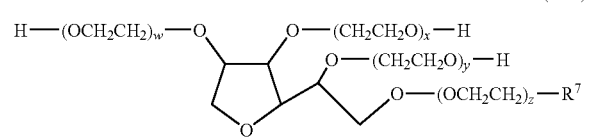
(VIII)

in which $R^7$ is a $C_1$ to $C_{20}$ alkyl group; and w+x+y+z is an integer from 1 to 100.

19. The ink composition as claimed in claim 4, wherein Formula (III) is the following Formula (VIII),

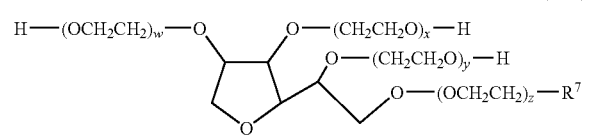
(VIII)

in which $R^7$ is a $C_1$ to $C_{20}$ alkyl group; and w+x+y+z is an integer from 1 to 100.

20. The ink composition as claimed in claim 4, wherein Formula (IV) is the following Formula (IX),

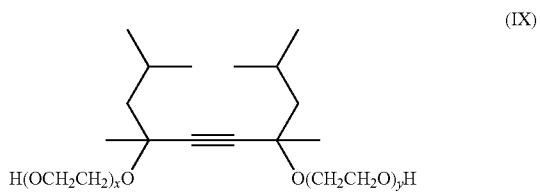
(IX)

in which x and y are integers from 0 to 100.

21. The ink composition as claimed in claim 3, wherein when X is a non-ionic polymer having 1 to 30 repeating units.

22. The ink composition as claimed in claim 4, wherein when $X^1$ and $X^2$ are non-ionic polymers having 1 to 30 repeating units.

23. The ink composition as claimed in claim 3, wherein the compound of Formula (II) comprises an acetylene glycol- or acetylene alcohol-based compound.

24. The ink composition as claimed in claim 4, wherein the compound of Formula (IV) comprises an acetylene glycol- or acetylene alcohol-based compound.

25. The ink composition as claimed in claim 1, wherein the plurality of additives are contained in an amount from 0.1 to 10 parts by weight based on 100 parts by weight of the ink composition, and the total content of the plurality of additives is 0.2 to 40 parts by weight or less based on 100 parts by weight of the ink composition.

26. The ink composition as claimed in claim 1, wherein the colorant is a self-dispersing pigment.

27. The ink composition as claimed in claim 1, wherein the colorant is contained in an amount of 0.5 to 10 parts by weight based on 100 parts by weight of the ink composition.

28. The ink composition as claimed in claim 1, wherein the solvent is selected from the group consisting of water, an organic solvent, and mixtures thereof.

29. The ink composition as claimed in claim 28, wherein the solvent is contained in an amount from 2 to 60 parts by weight based on 100 parts by weight of the ink composition.

30. The ink composition as claimed in claim 29, wherein the organic solvent is selected from the group consisting of alcohols, such as methyl alcohol, ethyl alcohol, n-propyl alcohol, isopropyl alcohol, n-butyl alcohol, sec-butyl alcohol, t-butyl alcohol, and isobutyl alcohol; polyhydric alcohols, such as ethylene glycol, diethylene glycol, trimethylolpropane, glycerol, polyethylene glycol, and polypropylene glycol; ketones, such as acetone, methyl ethyl ketone, and diacetone alcohol; esters, such as ethyl acetate and ethyl lactate; lower alkyl ethers, such as ethylene glycol monomethyl ether, ethylene glycol monoethyl ether, diethylene glycol methyl ether, diethylene glycol ethyl ether, triethylene glycol monomethyl ether, and triethylene glycol monoethyl ether; nitrogen-containing compounds, such as 2-pyrrolidone, N-methyl-2-pyrrolidone, and caprolactam; dimethyl sulfoxide; tetramethylsulfone; and thioglycol.

31. The ink composition as claimed in claim 1, wherein the ink composition has a surface tension of 15 to 70 dyne/cm at 20° C., and a viscosity of 1.5 to 10 cps.

32. The ink composition as claimed in claim 1, further comprising a component selected from the group consisting of a surfactant, a viscosity modifier, an acid, a base, a dispersing agent, a metal oxide and mixtures thereof.

33. The ink composition as claimed in claim 32, wherein the surfactant is contained in an amount from 0.1 to 5.0 parts by weight based on 100 parts by weight of the ink composition.

34. The ink composition as claimed in claim 33, wherein the viscosity modifier is selected from the group consisting of polyvinyl alcohol, casein, and carboxymethylcellulose, and contained in an amount from 0.1 to 10 parts by weight based on 100 parts by weight of the ink composition.

35. The ink composition as claimed in claim 33, wherein the acid and the base are contained in an amount from 0.1 to 20 parts by weight based on 100 parts by weight of the ink composition, respectively.

36. The ink composition as claimed in claim 33, wherein the dispersing agent is contained in an amount from 0.1 to 5 parts by weight based on 100 parts by weight of the ink composition.

37. An ink cartridge, as an ink cartridge of a wet-type image forming apparatus with an array head, comprising an ink composition which comprises a colorant, a solvent, and a plurality of additives, wherein the plurality of additives are different and of the same type and have one or more hydrophilic groups and one or more hydrophobic groups; and wherein each of the one or more hydrophobic groups of the plurality of additives have the same structure and the hydrophilic groups have a different structure, each of the one or more hydrophilic groups of the plurality of additives have the same structure and the hydrophobic groups have a different structure, or each of the one or more hydrophobic groups and each of the one or more hydrophilic groups of the plurality of additives have the same structure, where the plurality of additives have the Formula II $R^1$—X—$R^2$, or $X^1$—R—$X^2$     Formula IV in which R, $R^1$ and $R^2$ are selected from the group consisting of a hydrogen atom, a substituted or unsubstituted $C_5$ to $C_{25}$ alkyl group, a substituted or unsubstituted $C_5$ to $C_{25}$ cyclic alkyl group, a substituted or unsubstituted $C_5$ to $C_{25}$ heteroalkyl group, a substituted or unsubstituted $C_5$ to $C_{25}$ alkenyl group, a substituted or unsubstituted $C_5$ to $C_{25}$ alkoxy group, a substituted or unsubstituted $C_5$ to $C_{25}$ alkylsulfonamide group, a substituted or unsubstituted $C_5$ to $C_{25}$ arylsulfonamide group, a substituted or unsubstituted $C_5$ to $C_{25}$ acylamino group, $C_5$ to $C_{25}$ alkylureido group, $C_6$ to $C_{26}$ arylureido group, $C_5$ to $C_{25}$ alkoxycarbonyl group, $C_5$ to $C_{25}$ alkoxycarbonylamino group, a carbamoyl group, a sulfamoyl group, a sulfo group or salts thereof, a carboxy group or salts thereof, a substituted or unsubstituted $C_1$ to $C_{20}$ hydroxyalkyloxyalkyl group, a substituted or unsubstituted $C_5$ to $C_{25}$ dialkylaminoalkyl group, a substituted or unsubstituted $C_5$ to $C_{25}$ pyridyl group, a substituted or unsubstituted $C_6$ to $C_{26}$ pyridylalkyl group, a substituted or unsubstituted $C_6$ to $C_{26}$ imidazolyl group, a hydrazine group, a hydrozone group, a substituted or unsubstituted $C_5$ to $C_{25}$ pyridylalkyl group, a substituted or unsubstituted $C_6$ to $C_{26}$ aryl group, a substituted or unsubstituted $C_6$ to $C_{26}$ arylalkyl group, a substituted or unsubstituted $C_6$ to $C_{26}$ heteroaryl group, $C_6$ to $C_{26}$ heteroarylalkyl group, a substituted or unsubstituted $C_6$ to $C_{26}$ heteroarylalkenyl group, and a substituted or unsubstituted $C_5$ to $C_{25}$ heterocycloalkyl group; and X, $X^1$ and $X^2$ are each independently selected from the group consisting of alkylcarboxylic acid salts, alcohol sulfonic acid ester salts, alkylsulfonic acid salts, alkylbenzenesulfonic acid salts, aliphatic amine salts, quaternary ammonium salts, sulfonium salts, phosphonium salts, hydroxides, polyglycerine fatty acid esters, sorbitan fatty acid esters, acetylenic polyalkylene oxides, and acetylenic diols.

* * * * *